United States Patent
Howorka et al.

(10) Patent No.: US 9,412,133 B2
(45) Date of Patent: *Aug. 9, 2016

(54) SYSTEM AND METHOD FOR USER DEFINED MARKETS FOR ELECTRONIC TRADING

(71) Applicant: MarketFactory, Inc., New York, NY (US)

(72) Inventors: Edward R. Howorka, Denville, NJ (US); James H. Sinclair, New York, NY (US); Darren M. Jer, New York, NY (US)

(73) Assignee: MarketFactory, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/323,936

(22) Filed: Jul. 3, 2014

(65) Prior Publication Data

US 2015/0012411 A1 Jan. 8, 2015

Related U.S. Application Data

(63) Continuation of application No. 12/288,339, filed on Oct. 17, 2008, now Pat. No. 8,930,257.

(60) Provisional application No. 60/980,527, filed on Oct. 17, 2007.

(51) Int. Cl.
*G06Q 40/00* (2012.01)
*G06Q 40/04* (2012.01)

(52) U.S. Cl.
CPC .................................. *G06Q 40/04* (2013.01)

(58) Field of Classification Search
CPC ....... G06Q 10/00; G06Q 20/00; G06Q 30/00; G06Q 40/00
USPC ......................................................... 705/3–44
See application file for complete search history.

(56) References Cited

U.S. PATENT DOCUMENTS

| | | | |
|---|---|---|---|
| 7,246,093 B1 * | 7/2007 | Katz | 705/37 |
| 7,437,326 B2 * | 10/2008 | Slowik et al. | 705/37 |
| 7,707,091 B1 * | 4/2010 | Kauffman et al. | 705/36 R |
| 8,244,623 B2 * | 8/2012 | Colaio et al. | 705/37 |
| 8,249,972 B2 * | 8/2012 | Shalen | 705/36 R |
| 8,660,936 B1 * | 2/2014 | Banke et al. | 705/37 |
| 8,694,414 B2 * | 4/2014 | Mintz et al. | 705/37 |
| 8,930,257 B1 * | 1/2015 | Howorka et al. | 705/37 |
| 2008/0109351 A1 * | 5/2008 | Colaio et al. | 705/39 |
| 2008/0319826 A1 * | 12/2008 | LaComb et al. | 705/10 |
| 2013/0311352 A1 * | 11/2013 | Kayanuma et al. | 705/37 |
| 2013/0346274 A1 * | 12/2013 | Ferdinand et al. | 705/37 |
| 2014/0172675 A1 * | 6/2014 | Mintz et al. | 705/37 |

* cited by examiner

*Primary Examiner* — Frantzy Poinvil
(74) *Attorney, Agent, or Firm* — Van Pelt, Yi & James LLP

(57) ABSTRACT

A system and method for user defined markets for electronic trading is disclosed. In one embodiment, a technology platform is provided that allows a user to define a new market for electronic trading and automatically generate the new market for live trading. In one embodiment, the new market is automatically tested using a trading simulator that simulates the new market for electronic trading.

24 Claims, 28 Drawing Sheets

MarketFactory - Market Creation Wizard

What do you want to do?

⊙ Manage my Markets
○ Manage my ******
○ Manage my ******

[Logout]  [Next >]

Status: Logged In

FIG. 8

MarketFactory - Market Creation Wizard

My Marketplace/M2 Test Group 1/M2 Test Group 2

Market Type: Cash / Spot
Asset ID: Foreign Currency

Market Name:
M2 Test Market 2

Market Identifier:
1

Market Description:
Second Test Market for Milestone 2

[Cancel] [Finish Market]  [Next >]

Status: Logged In

FIG. 10A

MarketFactory - Market Creation Wizard

My Marketplace/M2 Test Group 1/M2 Test Group 2/M2 Test Market 2

Market Type: Cash / Spot ▼

Dropdown options:
- Cash / Spot
- Outright Forwards
- Forward Swaps
- NDF / CFD / FRA
- Options A transaction between a buyer and seller in which payment is given upon delivery of the underlying commodity (currency, grain, meat, metal, etc.).

In commodities markets this term is used to refer to the market in a particular grade and location of the underlying asset. The delivery and settlement of the deal is immediate, or within a few days, as compared with the future and options markets where delivery and settlement are delayed.

Asset ID:

Market Name: M2 Test Market 2

Market Identifier: 1

Market Description: Second Test Market for Milestone 2

[Cancel] [Finish Market]   [Next >]

Status: Fake Logged In

FIG. 10B

MarketFactory - Market Creation Wizard

My Marketplace/M2 Test Group 1/M2 Test Group 2/M2 Test Market 2

Market Type: [Cash / Spot ▼]
Asset ID: [Foreign Currency ▼]
- Foreign Currency
- Precious Metal
- Commodity
- Security Market Name:
[M2 Test Market 2]

Market Identifier:
[1]

Market Description:
[Second Test Market for Milestone 2]

[Cancel] [Finish Market]   [Next >]

Status: Fake Logged In

FIG. 10C

MarketFactory - Market Creation Wizard

My Marketplace/M2 Test Group 1/M2 Test Group 2/M2 Test Market
Market Element = AUD/NZD Market Elements in this Market:

| AUD/NZD |
| M2 EUR/USD |
| M2 USD/CAD |
| M2 USD/CHF |
| M2 USD/JPY |

[Add]
[Remove]
[Rename]
[Re-Sort]

Market Element Identifier: 5

Market Element Description:

Base Currency: AUD
Local Currency: NZD

Order Types:
Bid/Offer Limit, Buy/Sell Limit IOC

Market Data Access:
Market Book Transparency = Best Bid/Offer Price | Dealing Data Transparency = Deal Price | Take Price Defined As = Worst Price Obtained | Dealing Data Qualified As = Paid-Given

[Cancel] [Finish Market]   [<Back] [View/Edit Element]

Status: Logged In

FIG. 12

| MarketFactory - Market Creation Wizard |
|---|

My Marketplace/M2 Test Group 1/M2 Test Group 2/M2 Test Market
Market Element = M2 EUR/ZAR Market Element identifier: [0]

Apply a Template Instrument to this Market Element:

⊙ Use a Standard Instrument: [EUR/ZAR ▼]

⊙ Use one of My Instruments: [ ▽]

[Edit My Instruments]

Market Element Name: [M2 EUR/ZAR]

Market Element Description:
[EUR/ZAR for Milestone 2]

[Cancel] [Finish Element]                    [Next >]

Status: Logged In

FIG. 13

MarketFactory - Market Creation Wizard

My Marketplace/M2 Test Group 1/M2 Test Group 2/M2 Test Market
Market Element = M2 EUR/ZAR | Market Data Access Market Book Transparency: [Best Bid/Offer Price ▼]

Dealing Data Transparency: [Deal Price ▼]

Take Price Defined As: [Worst Price Obtained ▼]

Dealing Data Qualified As: [Paid-Given ▼]

[Cancel] [Finish Element]    [< Back] [Next >]

Status: Logged In

FIG. 15A

| 1. Market |
|---|
| 2. Market Elements |
| 3. Calendar |
| 4. Order Types |
| 5. Trading Access |

Grant Trading Access to

> Institutions
> Banks
> Hedge Funds

Regions:

[Allow specific ▼]

> North America
> South America
> Europe

Countries:

[Allow all ▼]

> Afghanistan
> Aland Islands
> Albania

Traders:

[Allow all ▼]

[Add Trader]

[Remove Trader]

| 6. Market Making Access |
|---|
| 7. Market Data Access |
| 8. Settlement |

| |
|---|
| 1. Market |
| 2. Market Elements |
| 3. Calendar |
| 4. Order Types |
| 5. Trading Access |
| 6. Market Making Access |

Market Makers:

[Allow all ▼]

[Add Trader]

[Remove Trader]

Note: Traders that are not allowed to make prices can only submit IOC orders.

| |
|---|
| 7. Market Data Access |
| 8. Settlement |

| |
|---|
| 1. Market |
| 2. Market Elements |
| 3. Calendar |
| 4. Order Types |
| 5. Trading Access |
| 6. Market Making Access |
| 7. Market Data Access |
| 8. Settlement |

Settlement Method:

○ Bilateral

⦿ Prime Brokered

○ Clearing House

Counterparties must participate as customers of a prime broker. If several prime brokers are selected, counterparties have a choice of prime broker. Settlement is between the counterparty and the prime broker according to the market documentation supplemented by any agreement between the prime broker and the customer. The prime brokers then, in turn, settle the trade between them.

Select Prime Broker or Brokers:

- Citi
- AIG
- Royal Bank of Scotland
- JPMorganChase
- Newedge
- Deutsche Bank

☑ Ultimate Name Giveup

1. Market
2. Market Elements
3. Calendar

Trade Dates

☐ Exclude Traded Commodity Holidays

☐ Exclude Payment Commodity Holidays

Exclude additional holidays: [Weekends ▼]

Settlement Date

Settlement date rule: [FX Spot Rules ▼]

Custom settlement rule: [Custom settlement rule]

4. Order Types
5. Trading Access
6. Market Making Access
7. Market Data Access
8. Settlement

MarketFactory - Market Creation Wizard

My Marketplace / M2 Test Group 1/M2 Test Group 2/M2 Test Market
Market Element = M2 EUR/ZAR | Calendar Non-standard End of Day Time (standard = 5:00 pm New York)

☐ Traded Commodity at:    ☐ Payment Commodity at:

[ 17 ] : [ 0 ]    [ 17 ] : [ 0 ]

[ - 5 EST ▼ ]    [ - 5 EST ▼ ]

Market Element's End of Day occurs at the:

[ Earlier of the two commodities' End of Day ▼ ]

Non-standard Business Days to Value Date (standard = 2 days)

☐ Traded Commodity has:    ☐ Payment Commodity has:

[ 2 business days ▼ ]    [ 2 business days ▼ ]

[ Cancel ]  [ Finish Element ]              [ < Back ]  [ Next > ]

Status: Logged In

FIG. 20

MarketFactory - Market Creation Wizard

My Marketplace / M2 Test Group 1/M2 Test Group 2/M2 Test Market
Market Element = M2 EUR/ZAR | Amount Parameters

- ⦿ Express amounts in EUR
- ○ Express amounts in ZAR
- ○ Express amounts in either EUR or ZAR

EUR

| | |
|---:|:---|
| Unit Decimal Places: | 0.01 |
| Lot Size: | 1,000,000 |
| Lot Size Name: | millions |
| Lot Size Short Name: | mm |
| Measurement type: | Currency |
| Increment (lots): | 1 |
| Minimum (lots): | 1 |
| Maximum (lots): | 999 |

[Edit]

[Cancel] [Finish Element]　　　　　　　　　　　　[< Back] [Next >]

Status: Logged In

FIG. 21

MarketFactory - Market Creation Wizard

My Marketplace/M2 Test Group 1/M2 Test Group 2/M2 Test Market
Market Element = M2 EUR/ZAR | Price Parameters

Price Properties
- Per trade unit: 1
- Pips and decimals: 4
- Typical spread: 0.002
- Wide spread: 0.05
- Market threshold: 0.003
- Typical price: 9.6268
- Regular amount (mm): 10

Price Display Properties
- Granularity: 1
- ☑ Separate Big Figure & Pips
- Pips start decimals: 2

Price Input Properties
- ☐ Input Different to Display
- ☐ Separate Big Figure & Pips
- Pips start decimals: 2
- ☐ All Pips Must Be Entered

[Edit]

[Cancel] [Finish Element]         [< Back] [Next >]

Status : Logged In

FIG. 22

0.0003.
Market threshold 0.0025
Typical price 2

EUR / USD
Trading EUR in EUR
Trade Holidays: European Union
Paying USD in USD
Payment Holidays: US Bank
Lot size 1000000
Trade sizes 1 to 999 in increments of 1.
Typical trade amount 1.
Prices listed as USD per 1 EUR with granularity 4 and typical spread of 0.0002.
Market threshold 0.0025
Typical price 1.3

Calendar:
Trading holidays are weekends
Trades settled FX Spot Rules

Order Types:
Order types allowed are Bid/Offer Limit, Buy/Sell LimitIOC, Iceberg.

Trade Access:
Trading restricted to all traders in North America.

Market Making Access:
Market making allowed by all traders.

Market Data Access:
Market book transparency set to Bid/Offer Price and Amount.
Dealing data transparency set to Deal Occurrence.
Take price is Worst Price Obtained.
Dealing data qualified as Paid-Given.

Settlement Rules:
Settlements will be prime brokered through JPMorganChase, Deutsche Bank, AIG, Citi, with names revealed.

[Abandon]　[Modify]　[Save]　[Accept]

FIG. 23

MarketFactory / Market Creation Wizard - Completed

Congratulations. You have Completed the Market Creation Wizard. The FX Spot XYZ market is ready for simulated trading according to the rules you laid out. We encourage you to test trading in this market and to return to the Market Creation Wizard for any fine-tuning required.

Your market definition will be reviewed by MarketFactory and we will respond within 24 hours. If any issues are found, we will help you to address them.

Thank you for choosing MarketFactory as your market platform.

Wishing you the best of success,

The MarketFactory team.

FIG. 24

SYSTEM AND METHOD FOR USER DEFINED MARKETS FOR ELECTRONIC TRADING

CROSS REFERENCE TO OTHER APPLICATIONS

This application is a continuation of co-pending U.S. patent application Ser. No. 12/288,339, entitled SYSTEM AND METHOD FOR USER DEFINED MARKETS FOR ELECTRONIC TRADING filed Oct. 17, 2008; which claims priority to U.S. Provisional Patent Application No. 60/980,527 entitled UNIVERSAL TRADING PLATFORM WITH USER-DEFINED MARKETS filed Oct. 17, 2007, which are incorporated herein by reference for all purposes.

BACKGROUND OF THE INVENTION

Trading technology platforms exist for trading in existing markets. For example, trading platforms exist for trading on security exchanges, such as NASDAQ.

BRIEF DESCRIPTION OF THE DRAWINGS

Various embodiments of the invention are disclosed in the following detailed description and the accompanying drawings.

FIG. 8 is another screen shot illustrating an embodiment of a market creation wizard for a user defined market for electronic trading showing an initial user selection page.

FIGS. 10a-c are screen shots illustrating an embodiment of a market creation wizard for a user defined market for electronic trading showing a market creation attribute page.

FIG. 12 is another screen shot illustrating an embodiment of a market creation wizard for a user defined market for electronic trading showing a market elements page.

FIG. 13 is another screen shot illustrating an embodiment of a market creation wizard for a user defined market for electronic trading showing a market element identifier page.

FIGS. 15a-e are screen shots illustrating an embodiment of a market creation wizard for a user defined market for electronic trading showing a market data access rules page.

FIG. 16 is another screen shot illustrating an embodiment of a market creation wizard for a user defined market for electronic trading showing a trading access rules page.

FIG. 17 is another screen shot illustrating an embodiment of a market creation wizard for a user defined market for electronic trading showing a market maker access page.

FIG. 18 is another screen shot illustrating an embodiment of a market creation wizard for a user defined market for electronic trading showing a settlement methods page.

FIG. 19 is another screen shot illustrating an embodiment of a market creation wizard for a user defined market for electronic trading showing a trading calendar page.

FIG. 20 is another screen shot illustrating an embodiment of a market creation wizard for a user defined market for electronic trading showing a trading hours page.

FIG. 21 is another screen shot illustrating an embodiment of a market creation wizard for a user defined market for electronic trading showing a trading currency page.

FIG. 22 is another screen shot illustrating an embodiment of a market creation wizard for a user defined market for electronic trading showing a market parameters page.

FIG. 23 is another screen shot illustrating an embodiment of a market creation wizard for a user defined market for electronic trading showing a new market specifications summary page.

FIG. 24 is another screen shot illustrating an embodiment of a market creation wizard for a user defined market for electronic trading.

DETAILED DESCRIPTION

Figure 1:
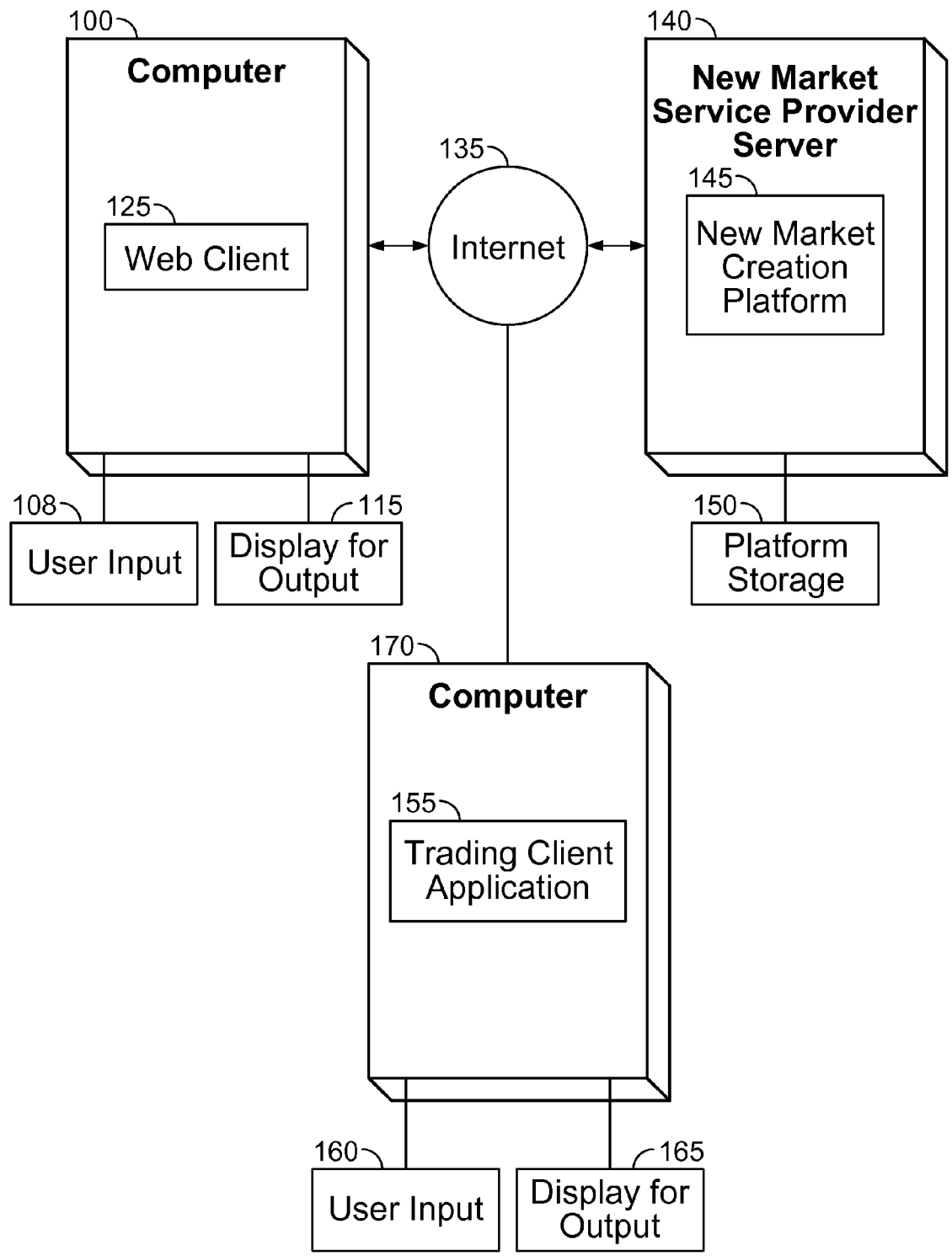
FIG. 1 is a high-level block diagram illustrating an embodiment of a system for a user defined market for electronic trading.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

While existing trading technology platforms (e.g., for financial trading instruments, such as precious metals, fixed income, commodities, and/or other verticals and instrument classes) allow for electronic trading of new currency exchanges, commodity exchanges, equity/security exchanges, and/or various other financial instrument exchanges, there is a need for a system and method for a universal trading platform that provides for the creation, automated testing, and trading of user defined markets. For example, a newly defined market (e.g., a market for electronic trading of a newly defined financial instrument for electronic trading, such as a new real estate derivative) often is substantially different from existing markets/financial instruments, such that the use of existing trading technology platforms is inefficient and delays the creation and trading of the new market (e.g., migrating a hard-coded platform, which generally is based on an initial platform that was implemented with the single purpose of trading an already existing instrument structure or class according to narrowly defined requirements, typically involves adapting and implementing new programmed functionality and configuration settings, and can often require up to one year or more to adapt to and then test for use in the newly defined market, and as a result, is also very expensive as such requires technical and programming development by skilled programmers).

What is needed is a system and method for a universal trading platform for user defined markets. For example, a trading technology platform that efficiently and easily allows a user to define a new market for electronic trading (e.g., specifying a new financial instrument and the associated rules for electronic trading of the new financial instrument) and the automated testing using simulated trading in the new market (e.g., prior to live trading) is needed.

In one embodiment, systems and methods disclosed herein provide a platform for electronic trading of any newly defined financial instrument. For example, a rule-based and data-driven platform is disclosed that allows a user to define a new market (e.g., creating a new financial instrument for trading, including, for example, a basic structure of the instrument, trading units, price granularity, matching rules, etc.), and automatically tests and provides a universal trading platform for the new market. In one embodiment, systems and methods disclosed herein provide a web-based platform and service for creating new markets, and moreover, provide for the use of social networking to promote newly created markets. In one embodiment, before implementing the electronic trading exchange platform for a newly defined market which typically involves coordination and approvals with various clearinghouses, automated testing is provided using a simulated market with automated trading (e.g., using automated trading bots (also referred to herein as trader simulators) based on various trading profiles and other criteria (e.g., specified events) that simulate realistic and dynamic market trading to simulate the new market, using market-based parameters with volatility/volume, etc.). For example, use of trader simulators to simulate the new market, that is, trading on the new electronic trading exchange for that new market, is superior to approaches that would rely on historical market data, which incorrectly assumes, for example, that a given trader's trading activities have no dynamic impact on the market.

The embodiments disclosed herein also facilitate the creation of a new market by allowing for a universe of users who are interested in trading a new financial instrument, and thus, this community of users (e.g., for a new real estate derivatives market) can help create the new market and define their desired trading rules (e.g., by the market creator and/or other authorized users), which increases the likelihood that the new market will be liquid as users will more likely use the newly defined/created market, compared to a trading exchange setting up a new market and hoping that users will use it and that they will set it up with rules/settings that are acceptable to the potential target users. For example, if there is a problematic or disfavored aspect in the initial definition of the market and/or its associated trading rules (e.g., users want five levels of depth/transparency instead of three levels of depth/transparency), then the market creator and/or its authorized users (e.g., users with market configuration settings authority/privileges) can dynamically and easily change that setting (e.g., such trading rule problems may also be detected during the automated testing using trader simulators, which allows the market creator to modify such trading rules before opening the new market for live trading).

FIG. 1 is a high-level block diagram illustrating an embodiment of a system for a user defined market for electronic trading. In the example shown, computer 100 is in network communication over Internet 135 with new market service provider server 140. Computer 100 receives user input 108 from, for example, a keyboard and/or a cursor pointing device (e.g., a mouse, touchpad, or other input device by which a user can input user activations for content, request content, add content, and/or provide metadata for content). Computer 100 executes web client 125, which communicates via Internet 135 to obtain trading platform information and content (e.g., wizards for defining new markets, and other configuration and platform-related information and settings).

New market service provider server 140 executes new market creation platform 145. New market creation platform 145 stores the new market configuration and related content in platform storage 150. In one embodiment, new market creation platform 145 provides a platform that allows a user to define a new market for a new class of financial instruments for trading electronically, including the associated trading and access rules. In one embodiment, new market creation platform 145 also provides for automated testing of the new market using automated trading bots for dynamically testing the new market through a market simulation of trading in the new market (e.g., prior to opening the new market for live trading).

Computer 170 executes trading client application 155, which allows a user to electronically trade in the new market. As shown, computer 170 also includes user input 160 and display for output 165. As shown, trading client application 155 communicates via Internet 135 with new market creation platform 145. In one embodiment, a user of the method and system of the present invention, such as the system embodiment shown in FIG. 1, refers to any individual person or any entity (and/or any group or department within an entity, e.g., an Information Technology (IT) department of a company) who defines, develops, test, modifies, trades in, and/or manages markets using method and system embodiments of the present invention.

In one embodiment, web client 125 is included in and/or executed in computer 100 as one or more of the following: a web browser plug-in or applet, an application program, a background software process, an embedded function of a web browser, or an embedded function of an operating system. In one embodiment, trading client application 155 is included in and/or executed in computer 170 as one or more of the following: a web browser plug-in or applet, an application program, a background software process, an embedded function of a web browser, or an embedded function of an operating system. In one embodiment, new market creation platform 145 is included in and/or executed in new market service provider server 140 as one or more of the following: a component of an electronic exchange trading platform, a web/application server, or an executable computer program.

One or more of the components and/or interactions between components may be optional and additional components not shown in FIG. 1 may be included. Those of ordinary skill in the art will recognize that computer 100 may be any computing device capable of communicating with Internet 135 and executing web client 125, including, for example, a general purpose computer (e.g., a PC or laptop executing a general purpose operating system, such as Microsoft, Apple, Linux, and/or Unix operating systems; a PDA or smart phone device, or any other device capable of executing applications and communicating with the Internet). Similarly, those of ordinary skill in the art will recognize that computer 170 may be any computing device capable of communicating with the Internet 135 and executing trading client application 155, including, for example, a general purpose computer (e.g., a PC or laptop executing a general purpose operating system such as Microsoft, Apple, Linux, and/or Unix operating systems; a PDA or smart phone device, or any other device capable of executing applications and communicating with the Internet). Those of ordinary skill in the art will also recognize that new market creation platform server 140 may be one or more computers or other computing devices in communication with Internet 135 and platform storage 150.

Figure 2:
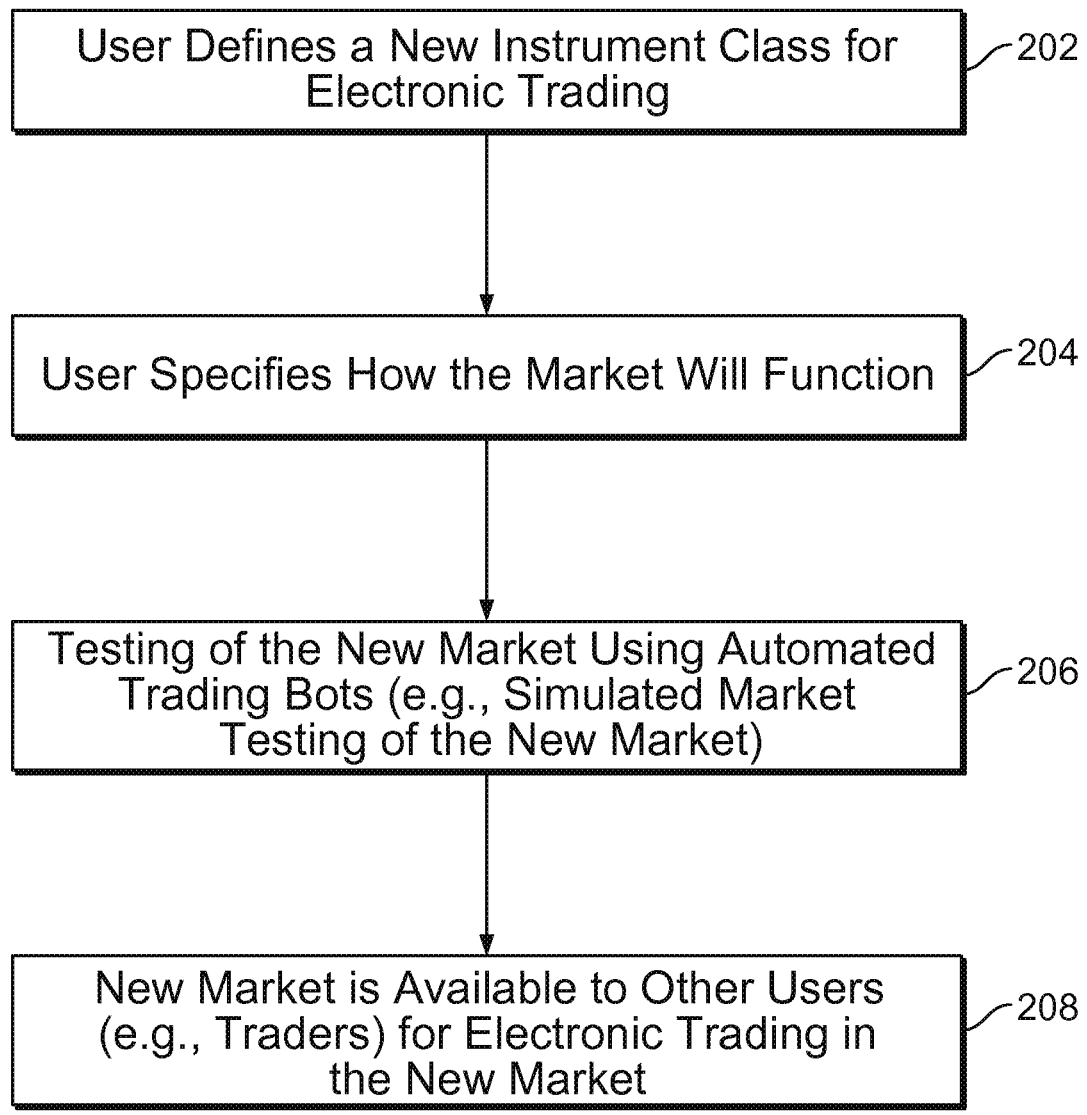
FIG. 2 is a flow diagram illustrating an embodiment of a process for a user defined market for electronic trading.

FIG. 2 is a flow diagram illustrating an embodiment of a process for a user defined market for electronic trading. Specifically, FIG. 2 illustrates a high-level process for creation of a new market (e.g., for retail and/or institutional market classes) for electronic trading in accordance with one embodiment of the present invention. At stage 202, a user (e.g., a market creator) defines a new market (e.g., in a given instrument class), including defining what will be traded in the new market. In one embodiment, a market creator is a user of the method and system of the present invention, such as the system embodiment shown in FIG. 1, and refers to any individual person or any entity (and/or any group or department within an entity, e.g., an Information Technology (IT) department of a company) to define, develop, test, modify, and/or manage markets using method and system embodiments of the present invention. In one embodiment, the user (e.g., the market creator or a user with market creator access rights) defines the new market using a web-based technology platform (e.g., using wizards and/or templates for efficiently and easily defining the new market, including the financial instrument(s) and associated trading rules). For example, the technology platform can be configured by a user for operating the new market according to the user specified requirements (rather than requiring a skilled programmer to hard code/program such new functionality). In one embodiment, new financial instruments include the following: government securities, credit derivatives, private securities, futures and/or options on futures, etc. At stage 204, the user specifies how the market will function, including, for example, interfaces, functionality, matching rules, settlement rules, transparency requirements, and other trading rules, etc. In one embodiment, a user can specify the new market as a child market to a parent/umbrella market, so that the new market inherits traits of the umbrella/parent market and/or to otherwise unite unique markets. At stage 206, trading bots (also referred to herein as trader simulators) are used for automated testing of the new market (e.g., a simulated market test of the new market). In one embodiment, based on testing results, the market creator can modify the specifications of the new market and/or the associated trading rules (e.g., trading increments, increasing or decreasing the degrees of transparency, etc.). At stage 208, the new market is available to other users (e.g., traders, that is, users (individuals and/or institutions) with trading access rights) for electronic trading in the new market. In one embodiment, a technology platform is provided for electronic trading of the newly defined class of instrument(s) according to the user defined market specifications and the access rules.

Figure 3:
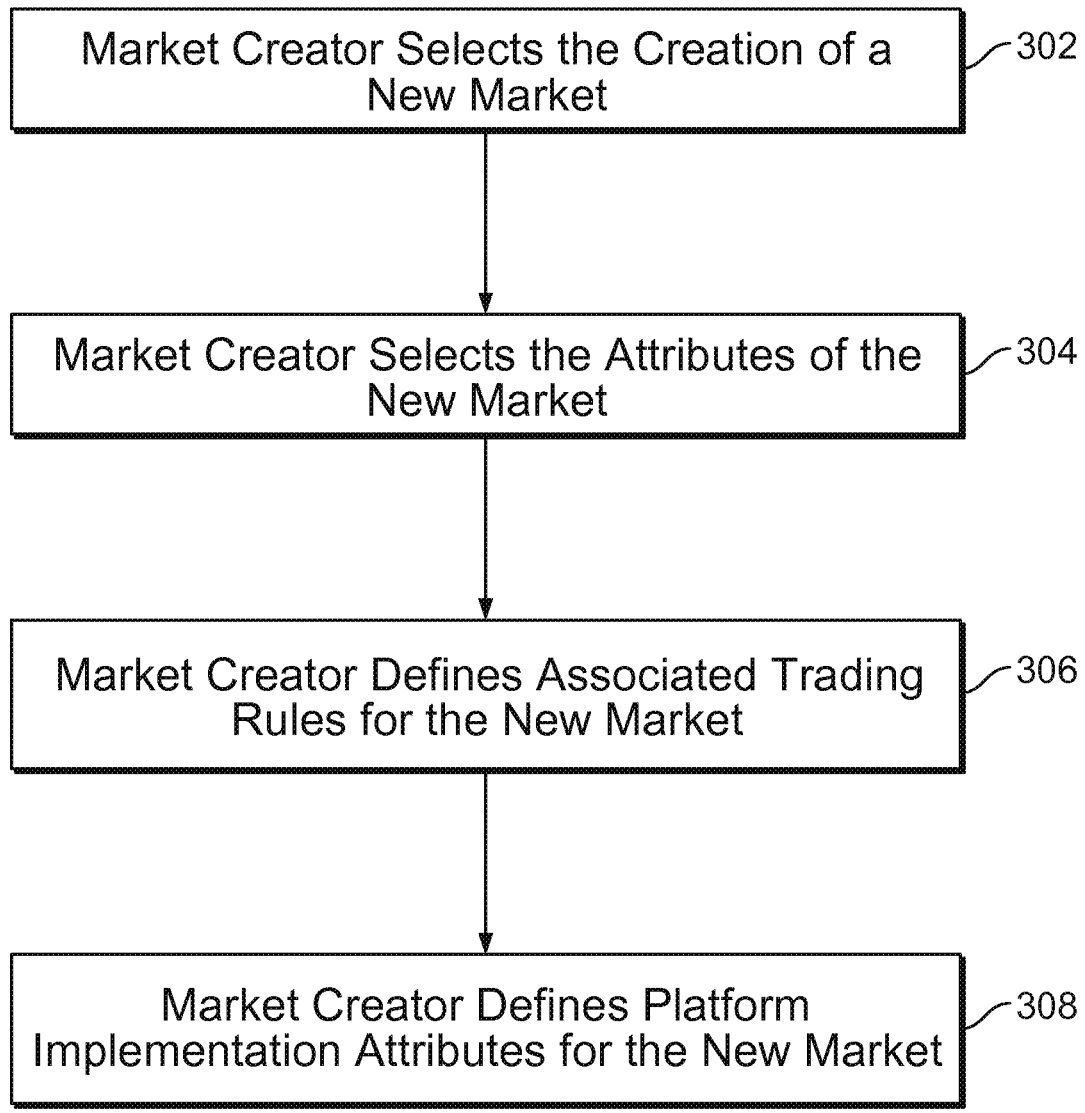
FIG. 3 is a flow diagram illustrating an embodiment of a process for a market creator to define a new market for electronic trading.

FIG. 3 is a flow diagram illustrating an embodiment of a process for a market creator to define a new market for electronic trading. Specifically, FIG. 3 illustrates a high-level process for a market creator to define a new market (e.g., for retail and/or institutional market classes) for electronic trading in accordance with one embodiment of the present invention. At stage 302, the market creator selects the creation of a new market. At stage 304, the market creator selects the attributes of the new market. For example, the market creator (e.g., a user with access rights to define a new market) selects and/or specifies attributes defining a new financial instrument for the new market using a simple configuration of a graphical user interface (GUI) (e.g., using a wizard or templates, implemented as a (hierarchical) set of web-based/GUI screens). At stage 306, the market creator defines associated trading rules for the new market. For example, the trading rules include a base amount in units, a minimum amount and minimum increment for trading of the new financial instrument defined for the new market, price granularity, matching rules, fundamental order types supported in the new market, market opacity (e.g., market information distributed in real-time), historical data opacity (e.g., market information distributed with a configurable delay), market visibility (e.g., market attributes visible to non-participants), and settlement method/rules. At stage 308, the market creator defines platform implementation attributes for the new market. For example, platform implementation attributes include selection of an interface to be used for the new market (e.g., a default GUI for the trading platform for the new market).

Figure 4:
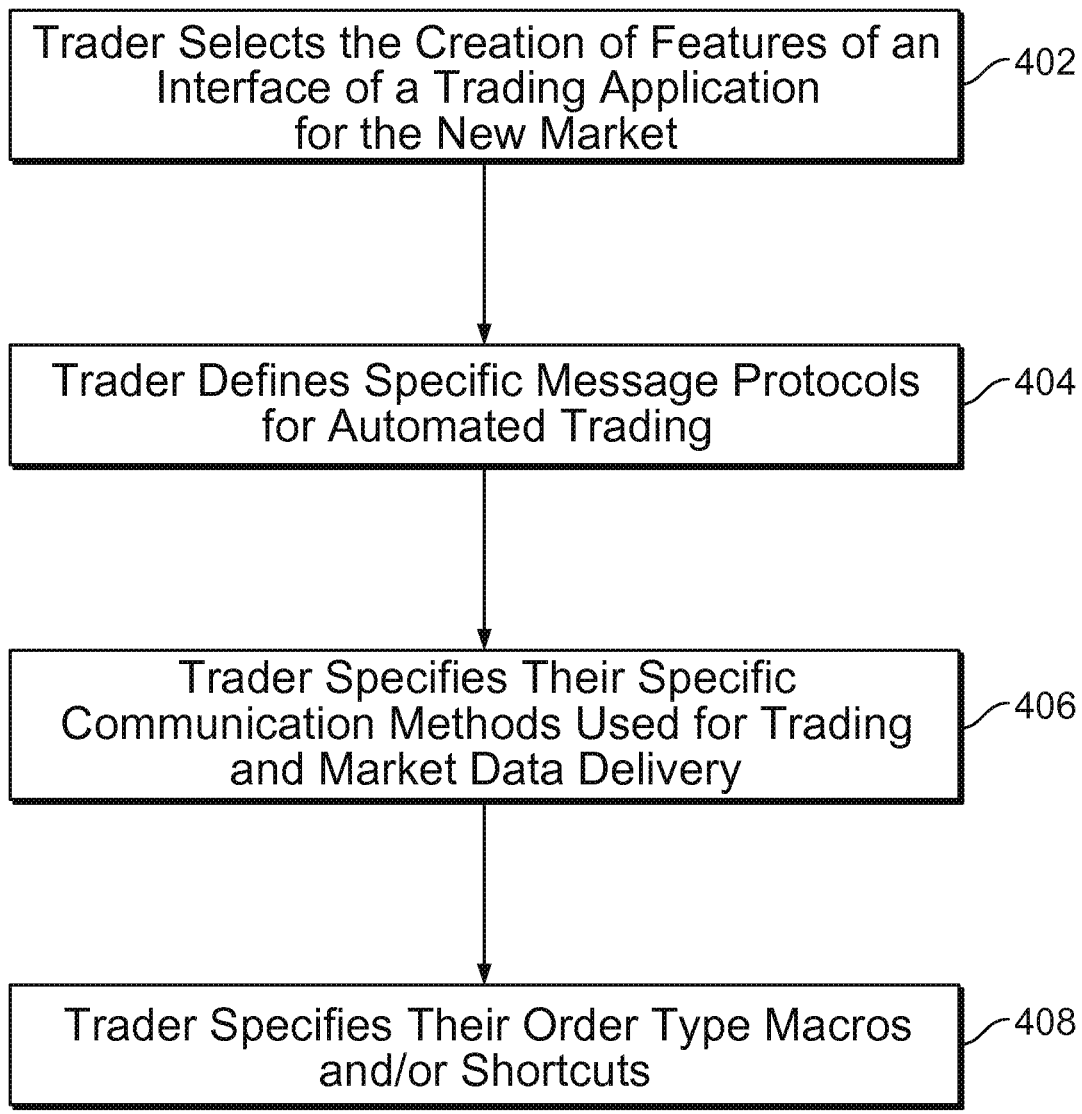
FIG. 4 is a flow diagram illustrating an embodiment of a process for a trader to define various attributes for a new market for electronic trading.

FIG. 4 is a flow diagram illustrating an embodiment of a process for a trader to define various attributes for a new market for electronic trading. Specifically, FIG. 4 illustrates a high-level process for a trader to define trader attributes for a new market (e.g., for retail and/or institutional market classes) for electronic trading in accordance with one embodiment of the present invention. In accordance with one embodiment of the present invention, a trader can define additional market attributes that only affect that trader's view and/or access to the new market (e.g., using a simple, easy to use configuration GUI of the trading client application). At stage 402, the trader (e.g., market participant who is a user with access for trading in the new market) selects the creation of features of an interface of a trading application for the new market (e.g., look and feel GUI features and/or shortcuts for specified operations). At stage 404, the trader defines specific message protocols for automated trading (e.g., including a custom protocol). At stage 406, the trader specifies their specific communication methods used for trading and market data delivery (e.g., broadband Internet data communication, dedicated circuit, etc.). At stage 408, the trader specifies their order type macros and/or shortcuts.

Figure 5:
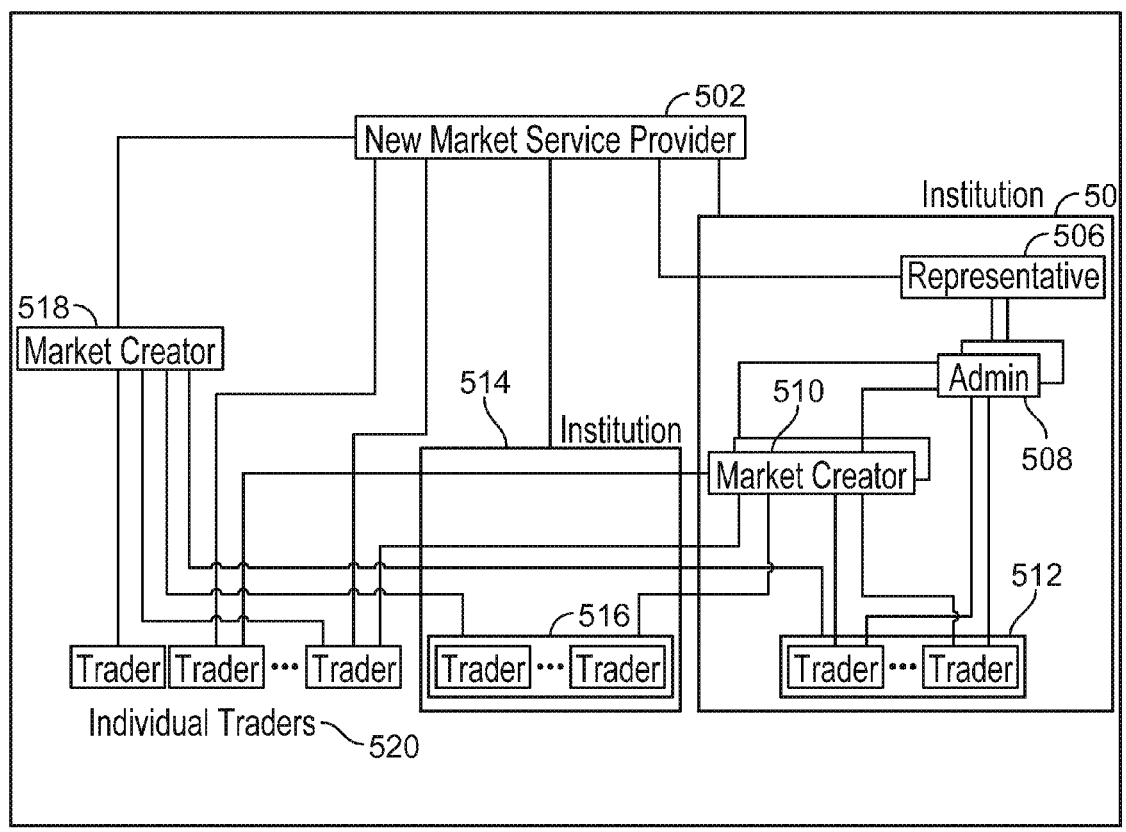
FIG. 5 is a block diagram illustrating an embodiment of an authorization matrix for a system for a user defined market for electronic trading.

FIG. 5 is a block diagram illustrating an embodiment of an authorization matrix for a system for a user defined market for electronic trading. In one embodiment, roles and/or attributes are defined for individual users, such as market creation rights to a market creator and trading rights to a trader. In one embodiment, access rights including various configuration and/or customization rights are also defined for institutional users (e.g., institution based market participants can also have additional roles and/or available attributes). For example, a Representative is defined as the most senior role in an institution. A Representative appoints and authorizes Administrators and is able to reserve the right of final approval for any market configuration changes or delegate this right to Administrators. The Representative's approval is binding for the institution. An Administrator is responsible for granting and revoking market creation (e.g., Market Creator) and trading (e.g., Trader) privileges on behalf of the institution. The Administrator is also responsible for maintaining and monitoring credit lines.

As shown in FIG. 5, a New Market Service Provider 502 has authority for granting various access rights/privileges and/or roles to a market participant that will then be a market creator, a trader, and/or an institution (e.g., an institution can include Market Creators, Traders, as well as other defined roles, such as Representative and Administrator, as also discussed above). New Market Service Provider 502 also has authority to grant institutional access rights as well as specified roles for institutions, such as for Institution 504 and Institution 514. As shown, Institution 504 includes a Representative 506, an Administrator 508 (e.g., one or more Administrators can be authorized for the institution), a Market Creator 510 (e.g., one or more Market Creators can be authorized for the institution), and multiple Traders 512. As shown, Institution 514 includes multiple Traders 516. As also shown in FIG. 5, New Market Service Provider 502 has granted market creation rights to Market Creator 518 and trading rights to multiple Individual Traders 520.

In one embodiment, New Market Service Provider 502 authorizes each institution to create new markets of specific types, trade in new markets of specific types, and allows a specified Representative of each institution to authorize members of the institution for market creation or trading within the authorization limits imposed by New Market Service Provider 502. An institution's Representative can appoint one or more Administrators (and can also appoint himself/herself as an Administrator). Administrators generally act on behalf of the Representative. An Administrator's privileges may also be limited to specific functions (e.g., credit administration), specific market types, and/or specific markets. Institution Administrator(s) appoint Market Creators and can also restrict their entitlements to creation of markets of specific types. Institution Administrator(s) appoint Traders and can also restrict their trading access to specific markets. An Institution Market Creator can define markets where the access is limited to specific Traders of his/her institution (e.g., market access is controlled by both the Administrator and Market Creator). New Market Service Provider 502 authorizes each Market Creator to create markets of specific types. Institution Market Creator may define markets where the access is limited to specific individual Traders, specific institutions, and/or specific Traders of his institution. In one embodiment, a Market Creator cannot define market access to his/her markets for specific Traders of another institution. New Market Service Provider 502 authorizes each Individual Trader 520 to trade in markets of specific types.

Figure 6:
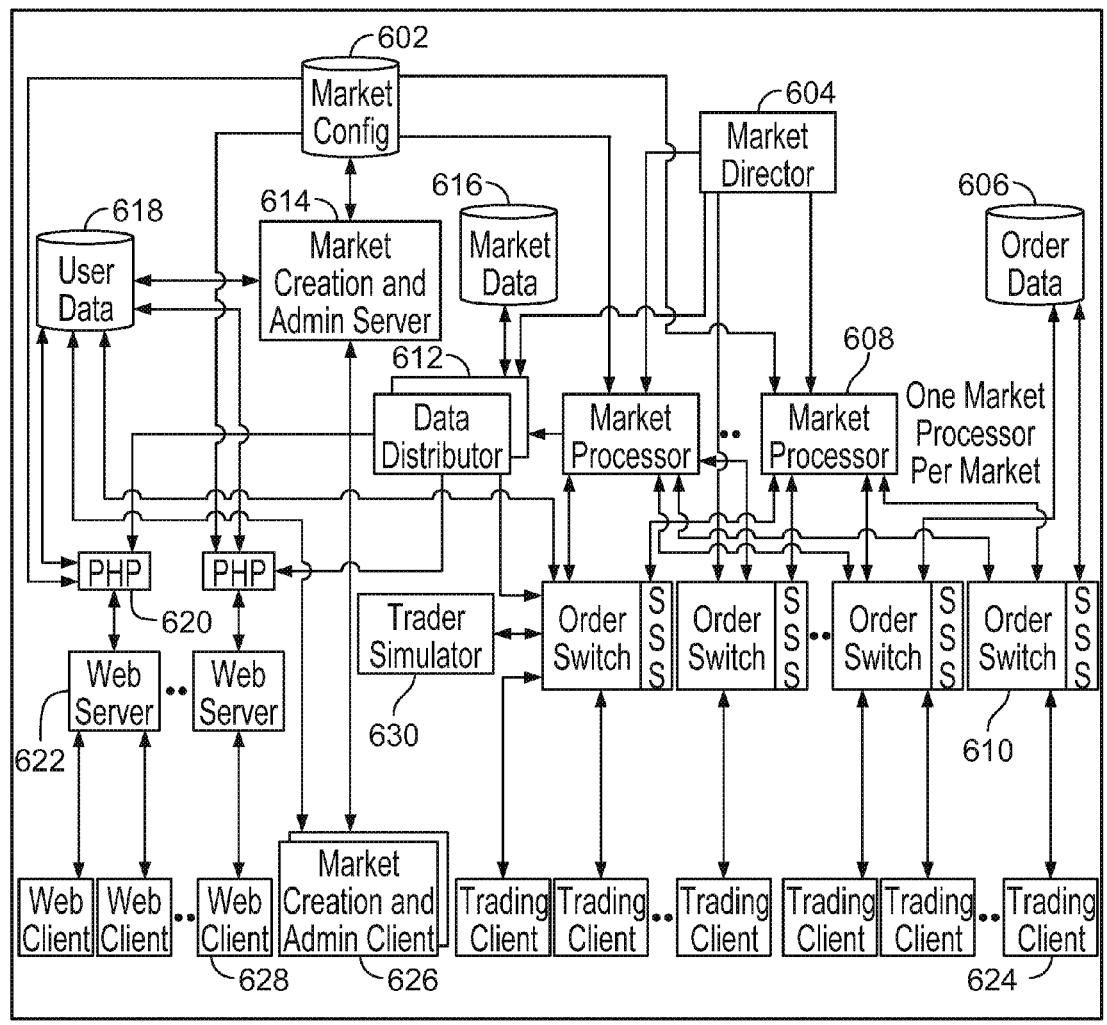
FIG. 6 is a block diagram illustrating an embodiment of a high-level architecture for a system for a user defined market for electronic trading.

FIG. 6 is a block diagram illustrating an embodiment of a high-level architecture for a system for a user defined market for electronic trading. Market Configuration database 602 stores market definitions, as defined by a Market Creation Wizard (discussed below), which is used, for example, by all trading components. In one embodiment, for each new market, the following attributes are stored:

1. Market Grouping (an administrative categorization)
2. Market Name
3. Market Description
4. Market Identifier
5. Market Type
6. Sub-Markets
7. Instruments and Underlying Commodities
8. Strike Prices
9. Tenors
10. Trading Lot Sizes
11. Supported Order Types
12. Price Granularity
13. Price Transparency
14. Trading Calendar
15. Settlement Calendar Method
16. Trading Access
17. Market Making Access
18. Market Data Access
19. Settlement Scheme
20. Market Simulation In one embodiment, Market Creation Wizard users will be provided with default templates for common instruments and their underlying commodities to assist in the specification of sub-markets. Additionally, Market Creation Wizard users can create their own instrument and commodity templates for defining sub-markets. Market Creation Wizard users can also define market level templates that provide consistent defaults (e.g., Market Making Access, Market Data Access, Price Transparency, etc.) for each newly created sub-market.

Order Data database 606 stores all orders, cancellations, and done deals. Market Data database 616 stores historical market data.

User Data database 618 stores details of user status, entitlements, and institutional identifiers, including, for example, the following: user ID, user entitlements, user profile, user credentials (password), and user parent institution (if any).

As shown, FIG. 6 also illustrates various components for a system for a user defined market for electronic trading in accordance with one embodiment of the present invention. For example, Market Director 604 determines which Market Processor 608 owns which market. Market Director 604 also maintains and provides component direction to Order Switches 610.

Market Processor 608 maintains current bid and offer lists. Market Processor 608 also processes simple match orders (e.g., bid/offer, buy/sell). Order Switch 610 implements communications with each Trading Client(s) 624. Order Switch 610 also provides, for example, the following functions: compound order processing, intelligent order processing, keystroke logging, accept and log all orders (e.g., including I/O), implement persistent orders, implement deal completion, implement message protocol, implement FIX (Financial Information eXchange protocol, see http://www.fixprotocol.org/) and other industry standard protocols for specific markets, implement STP (Straight-Through Processing, which refers to transaction hand-off between trading applications (e.g., front office applications) to position keeping and accounting applications/servers (e.g., back office applications), e.g., STP can be implemented using FIX or other known messaging protocols) update Order Database 606, distribute market data to all connected clients, and implement SSS (Synchronous Spooling Services).

Data Distributor 612 receives, logs, and processes all market messages from Market Processors 608 for specific markets, and also distributes market data to all subscribers (e.g., Order Switches 610, Web Servers 622, and Market Data database 616).

Web Server 622 (in communication with PHP script 620) serves all static web contents (e.g., web pages) to each Web Client 628, implements interfaces with back-end components, implements interfaces with databases, and provides user authentication.

Web Client 628 displays static web contents (web pages), blogs and social networking tools, displays market lists, displays market data (for the general public), launches Trading Client 624, launches Market Creation and Admin Client 626, and allows user to sign-in.

Trading Client 624 provides the following functions: application configuration, market data display, order entry, deal blotter, and position keeping. In one embodiment, a trading message-level interface provides the same functions for Trading Client 624 through a message-level interface implemented in a market type specific industry-standard protocol (market type permitting). In one embodiment, a trading API (Application Programming Interface) provides the same functions for Trading Client 624 through an API implemented in ActionScript, Java, or C#. In one embodiment, an STP message-level interface provides deal notifications in real-time and provides deal history on demand. For example, an STP API provides the same functions for STP through an application programming interface implemented in Action-Script, Java, or C#.

Market Creation and Admin Client 626 provides the following functions: a Market Creation Wizard, market maintenance, and Institution Admin functions. A billing system (not shown) maintains all data that is used for billing, and also maintains statistical data regarding client behavior. In one embodiment, the billing system is implemented as part of Market Creation and Admin Server 614 and Market Creation and Admin Client 626.

In one embodiment, messages communicated between these various components include the following types of messages. Messages transmitted between Order Switch 610 and Trading Client 624 include market data (e.g., transmitted using a broadcast or multicast protocol), market configuration parameters, order entry/response (e.g., high priority data), log messages (e.g., activity, order history, etc.), user events (e.g., keystrokes, etc.), event notifications, and reports (e.g., low priority historical data reports). Messages transmitted between Market Processor 608 and Order Switch 610 include orders and order confirmations, and complex order synchronization (e.g., involving multiple markets). Messages between Market Creation and Admin Server 614 and Market Creation and Admin Client 626 include market definitions storage and retrieval, and market processor control functions. Messages transmitted between Market Processor 608 and Data Distributor 612 include detailed market data sufficient to maintain the market book and produce dealt prices. All orders, cancellations, and deals are transmitted, including counterparty and trader IDs, and market configuration details, such as credit matrix and/or credit limits are transmitted. Messages transmitted between Market Director 604 and Market Processor 608 include market assignment (e.g., Market Director 604 informs Market Processor 608 which markets it is executing), and market control (e.g., Market Director 604 instructs Market Processor 608 to start/stop the market). Messages transmitted between Market Director 604 and Order Switch 610 include market processor address discovery. Messages transmitted between Market Director 604 and Data Distributor 612 include market processor address discovery.

In one embodiment, the Market Creation and Admin Server 614 and Market Creation and Admin Client 626 allow users with market creator access rights to subsequently (after it has already been created) change parameters and/or specifications of the market (e.g., instrument class specifications, associated trading rules, and access rights and privileges). In one embodiment, the platform authenticates the identity of each user of the system. The Market Creation and Admin Server 614 and Market Creation and Admin Client 626 also can provide reports for users, including for Market Creators, market participants, and the new market platform service provider.

In one embodiment, a trader simulator is software executable on a computer (e.g., a server) for providing an automated trading simulation (e.g., a simulated trading model for simulating live trading in a market by live traders and/or model traders). For example, a trader simulator can simulate tens or hundreds of trading clients, in which the simulator can simulate live traders or model traders, or both. As shown in FIG. 6, Trader Simulator 630 is in communication with Order Switches 610. In one embodiment, Trader Simulator 630 is implemented as a computer process executing on a server, which establishes multiple communications/connections to one or more Order Switches 610. In one embodiment, the simulator uses Monte Carlo (random number) techniques with controllable probability distributions to generate trading actions matching the desired activity profile (e.g., human trader, black box traders, cautious trader, market maker, etc.).

Figure 7:
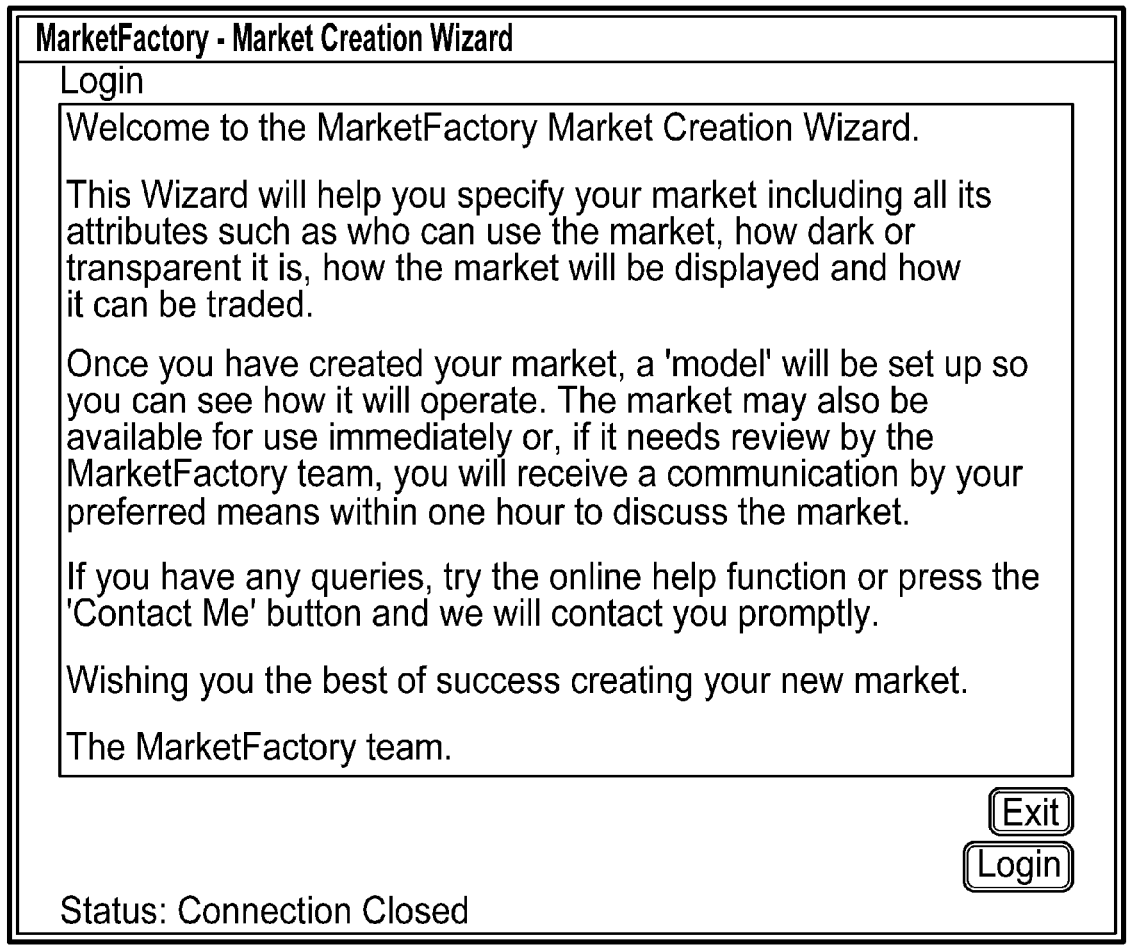
FIG. 7 is a screen shot illustrating an embodiment of a market creation wizard for a user defined market for electronic trading showing a login page.

FIG. 7 is a screen shot illustrating an embodiment of a market creation wizard for a user defined market for electronic trading showing a login page. As shown, FIG. 7 illustrates a login page for a market creation wizard that allows a (market creator) user to specify a new market including its attributes and who can use the market (e.g., access rights and privileges).

FIG. 8 is another screen shot illustrating an embodiment of a market creation wizard for a user defined market for electronic trading showing an initial user selection page. In one embodiment, a market creation wizard for a user defined market for electronic trading is implemented as a set of (hierarchical) web pages that allow a user to easily navigate the wizard, which provides various templates, for creating and managing their user defined markets. As shown, FIG. 8 illustrates a web page that allows a user to select the following options: manage my markets, manage my instruments, and manage my commodities and currencies.

Figure 9:
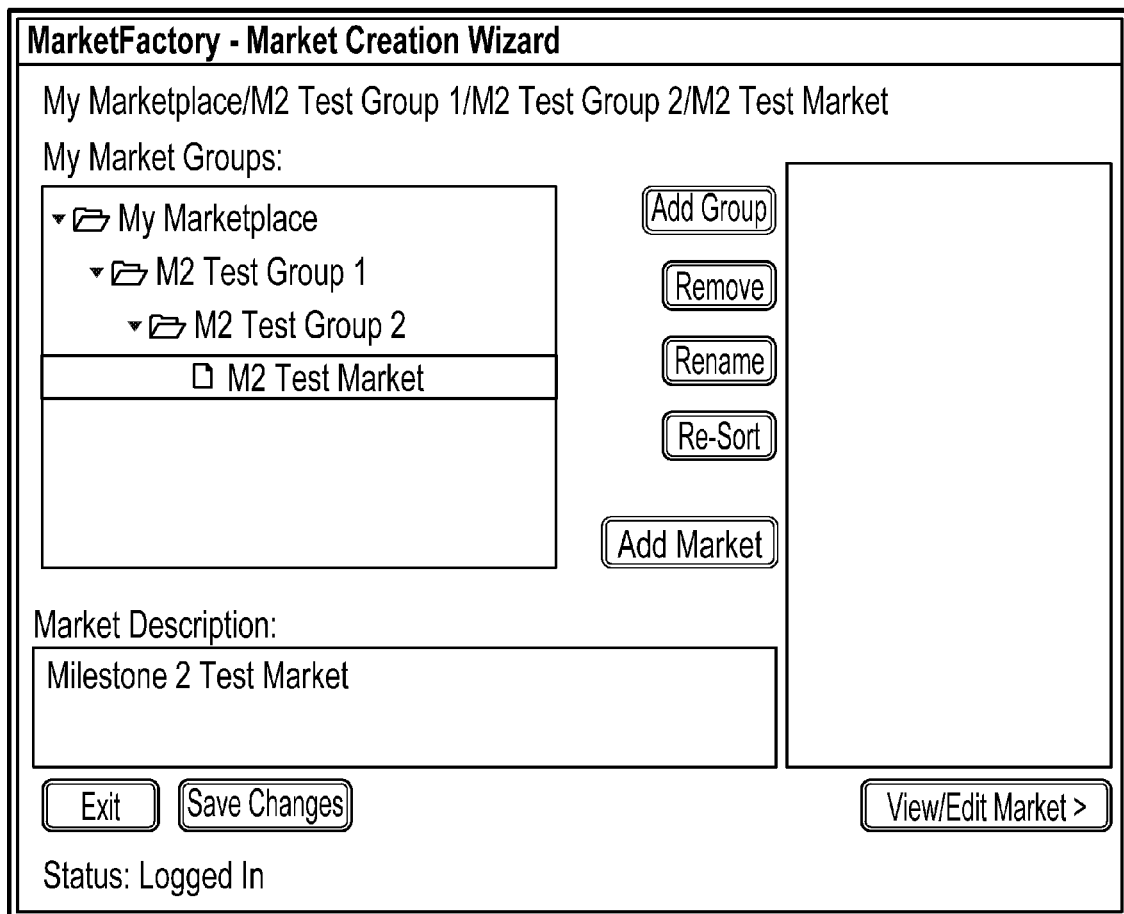
FIG. 9 is another screen shot illustrating an embodiment of a market creation wizard for a user defined market for electronic trading showing a market creation name and description page.

FIG. 9 is another screen shot illustrating an embodiment of a market creation wizard for a user defined market for electronic trading showing a market creation name and description page. As shown, FIG. 9 illustrates a web page that allows a user to name a new market group and provide an associated description, as well as to remove and rename existing market groups. In this example, the user has created an M2 Test Market and an associated market description as Milestone 2 Test Market.

FIGS. 10a-c are screen shots illustrating an embodiment of a market creation wizard for a user defined market for electronic trading showing a market creation attribute page. As shown, FIGS. 10a-c illustrate a web page that allows a user to navigate the GUI to select a market type (e.g., Cash/Spot Market, Outright Forwards, Forward Swaps, etc.), asset ID (e.g., Foreign Currency, Precious Metal, Commodity, Security), market name, market identifier, and market description.

Figure 11:
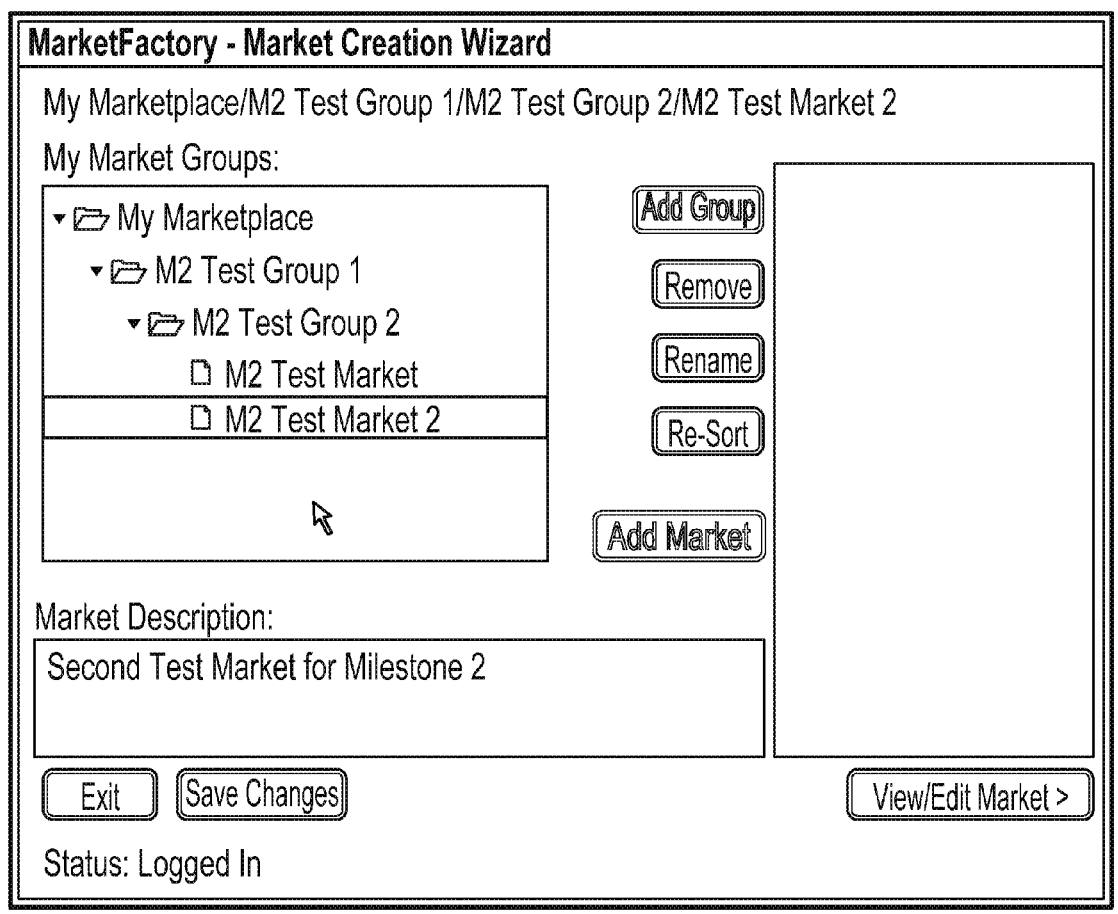
FIG. 11 is another screen shot illustrating an embodiment of a market creation wizard for a user defined market for electronic trading showing a market creation name and description page.

FIG. 11 is another screen shot illustrating an embodiment of a market creation wizard for a user defined market for electronic trading showing a market creation name and description page. As shown, FIG. 11 illustrates the web page, as similarly shown in FIG. 9, which allows a user to name a new market group and provide an associated description, as well as to remove and rename existing market groups. In this example, the user has additionally created an M2 Test Market 2 and an associated market description as Second Test Market for Milestone 2.

FIG. 12 is another screen shot illustrating an embodiment of a market creation wizard for a user defined market for electronic trading showing a market elements page. As shown, FIG. 12 illustrates a web page that allows a user to select market elements in this market, a market element identifier, a market element description, a base currency, a local currency, order types, and market data access rules.

FIG. 13 is another screen shot illustrating an embodiment of a market creation wizard for a user defined market for electronic trading showing a market element identifier page. As shown, FIG. 13 illustrates a web page that allows a user to select a market element identifier, apply a template instrument to the selected market element (e.g., using a standard instrument or an instrument specified by the user), a market element name, and a market element description.

Figure 14:
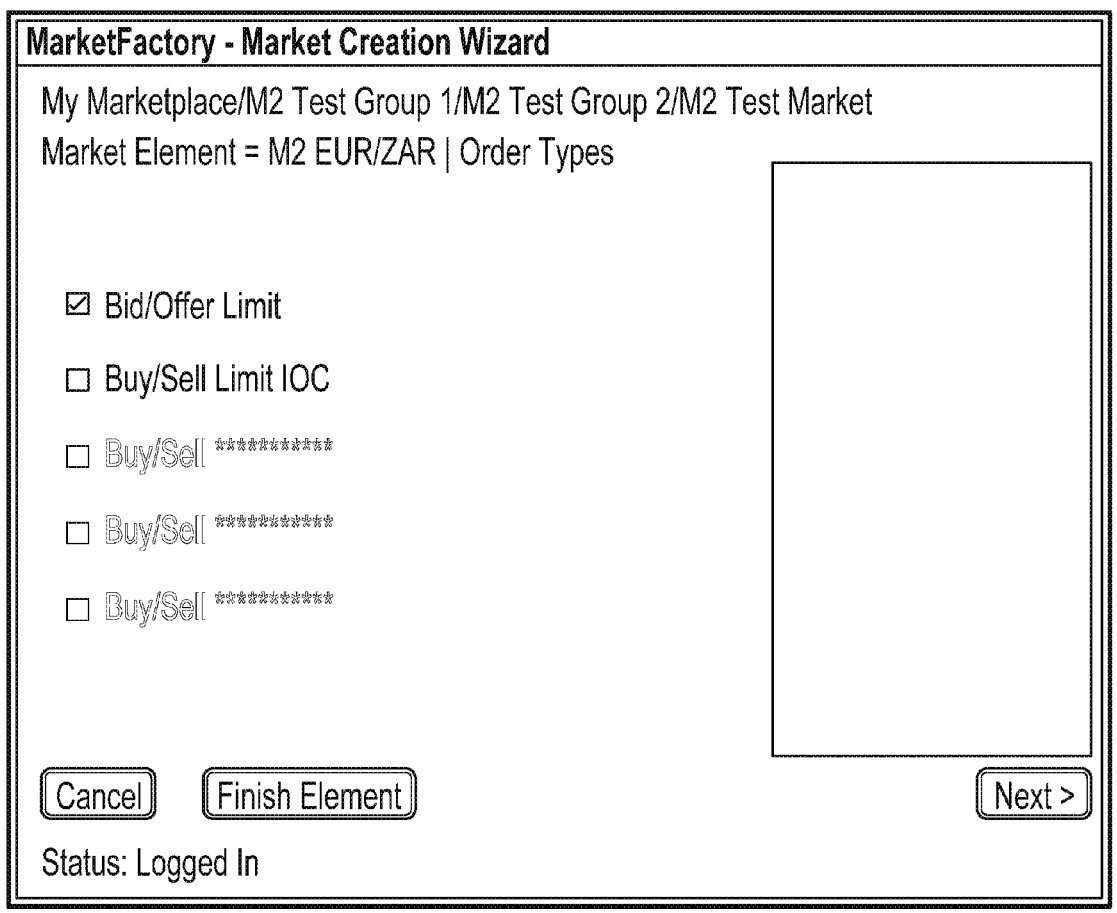
FIG. 14 is another screen shot illustrating an embodiment of a market creation wizard for a user defined market for electronic trading showing an order type page.
Figure 15B:
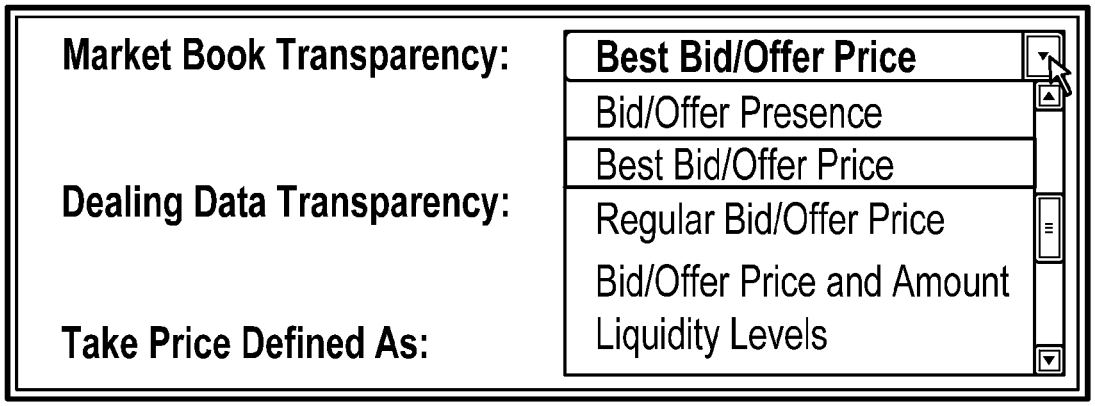
Figure 15C:
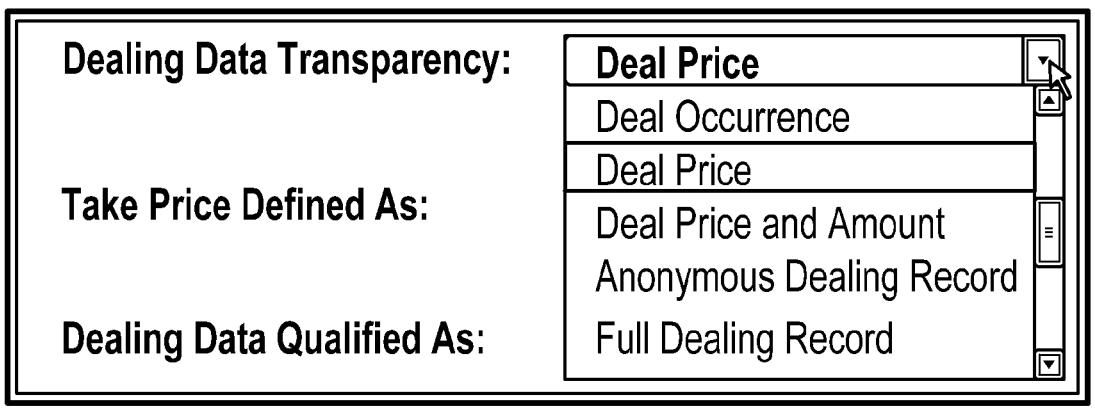
Figure 15D:
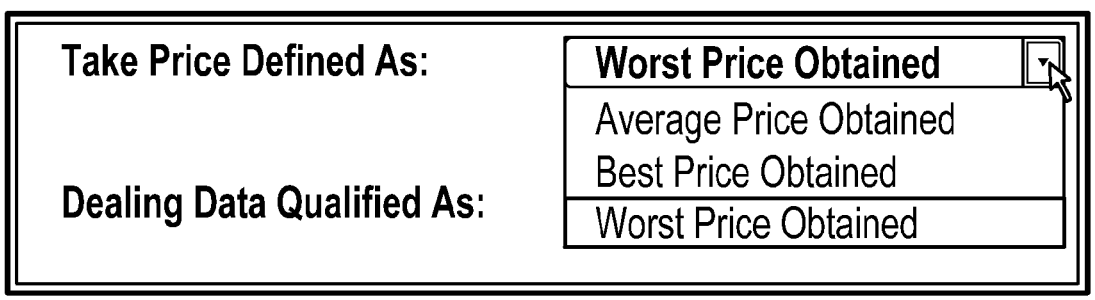
Figure 15E:
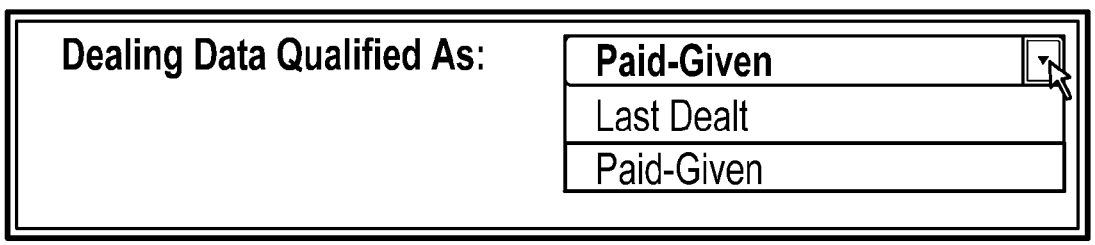

FIG. 14 is another screen shot illustrating an embodiment of a market creation wizard for a user defined market for electronic trading showing an order type page. As shown, FIG. 14 illustrates a web page that allows a user to select order types, including bid/offer limit, buy/sell limit IOC, buy/sell fill or kill, iceberg, and buy/sell stop limit.

FIGS. 15a-e are screen shots illustrating an embodiment of a market creation wizard for a user defined market for electronic trading showing a market data access rules page. As shown, FIGS. 15a-e illustrate a web page that allows a user to specify market data access rules, including market book transparency (e.g., Best Bid/Offer Price, Regular Bid/Offer Price, etc.), dealing data transparency (e.g., Deal Price, Deal Price and Amount, etc.), take price definition (e.g., Worst Price Obtained, Average Price Obtained, etc.), and dealing data qualification (e.g., Paid-Given).

FIG. 16 is another screen shot illustrating an embodiment of a market creation wizard for a user defined market for electronic trading showing a trading access rules page. As shown, FIG. 16 illustrates a web page that allows a user to specify trading access rules for the new market, including by entity type (e.g., institutions, banks, hedge funds, etc.), by region (e.g., North America, South America, Europe, Asia, etc.), by country, and by trader (e.g., by specific user/trader ID/name or allow all).

FIG. 17 is another screen shot illustrating an embodiment of a market creation wizard for a user defined market for electronic trading showing a market maker access page. As shown, FIG. 17 illustrates a web page that allows a user to specify which market makers have access to the market (e.g., by specific user/trader ID/name or allow all).

FIG. 18 is another screen shot illustrating an embodiment of a market creation wizard for a user defined market for electronic trading showing a settlement methods page. As shown, FIG. 18 illustrates a web page that allows a user to specify settlement methods (e.g., bilateral, prime brokered, or clearing house) and to select prime broker or brokers.

FIG. 19 is another screen shot illustrating an embodiment of a market creation wizard for a user defined market for electronic trading showing a trading calendar page. As shown, FIG. 19 illustrates a web page that allows a user to specify trading dates when the market is available for active trading and to also select settlement date rules (e.g., standard by market or custom settlement rules).

FIG. 20 is another screen shot illustrating an embodiment of a market creation wizard for a user defined market for electronic trading showing a trading hours page. As shown, FIG. 20 illustrates a web page that allows a user to define the specific hours for trading in the market and also to specify a number of business days to value date by traded commodity and payment commodity.

FIG. 21 is another screen shot illustrating an embodiment of a market creation wizard for a user defined market for electronic trading showing a trading currency page. As shown, FIG. 21 illustrates a web page that allows a user to specify the currency (e.g., in EUR, ZAR, or either/or) and increments by which instruments are traded in the market (e.g., unit decimal places, lot size, lot size name, lot size short name, measurement type, increment (lots), minimum (lots), and maximum (lots)).

FIG. 22 is another screen shot illustrating an embodiment of a market creation wizard for a user defined market for electronic trading showing a market parameters page. As shown, FIG. 22 illustrates a web page that allows a user to configure market parameters for the new market including price properties (e.g., per trade unit, pips and decimals, typical spread, wide spread, market threshold, typical price, and regular amount), price display properties (e.g., granularity and pips start decimals), and price input properties.

FIG. 23 is another screen shot illustrating an embodiment of a market creation wizard for a user defined market for electronic trading showing a new market specifications summary page. As shown, FIG. 23 illustrates a web page that summarizes specifications for the new market selected by the user using the market creation wizard, including specifications related to currency, calendar/trading dates, order types, trade access, market making access, market data access, and settlement rules.

FIG. 24 is another screen shot illustrating an embodiment of a market creation wizard for a user defined market for electronic trading showing a new market creation completed page. As shown, FIG. 24 illustrates a web page of the market creation wizard informing a user that the market creation wizard process for the new market has now been completed.

In one embodiment, a market simulator will allow the market creator to test the new market that he/she has created by simulating the activity of the expected market participants actively and dynamically trading in the new market and/or to also allow a small group of live traders to test the new market (prior to permitting live trading in the new market). For example, the following components of a simulated market behavior can be defined: types of simulated market participants (e.g., market makers and market takers), mix of simulated participants, behavior of simulated market participants (e.g., liquidity provided and trading strategy), and daily trading patterns (e.g., special event simulation).

Figure 25:
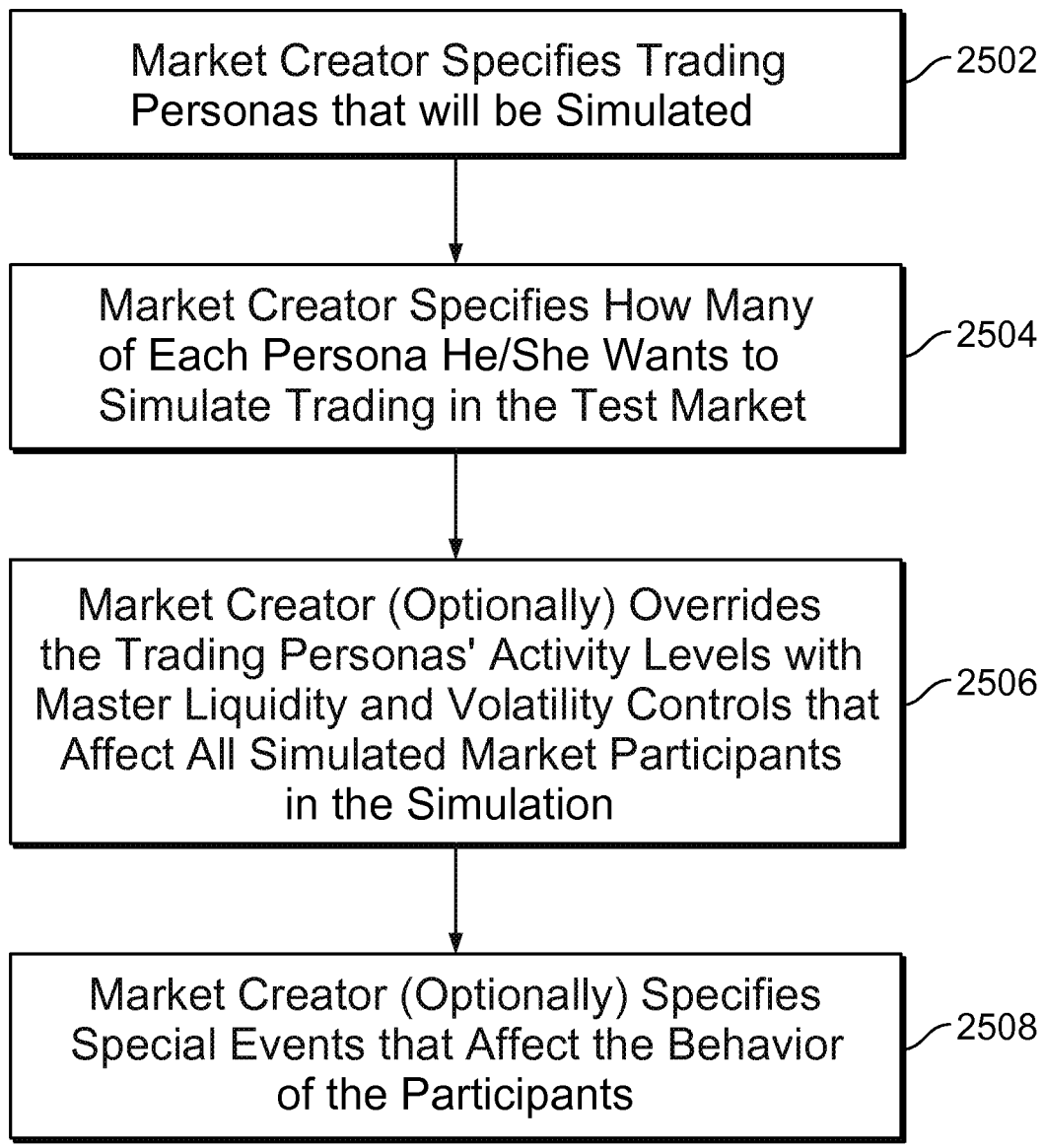
FIG. 25 is a flow diagram illustrating an embodiment of a process for a user to specify simulation parameters for automated testing of a user defined market for electronic trading.

FIG. 25 is a flow diagram illustrating an embodiment of a process for a user to specify simulation parameters for automated testing of a user defined market for electronic trading. Specifically, a user can specify parameters for testing the new market for simulated market testing. For example, after a user has created a new market using the above discussed new market creation wizard, a user can then specify various parameters for simulated testing to simulate live market trading for the new market. Simulated testing can be used for a number of different purposes, including testing of black box trading models prior to deployment in a live market, testing of a new market to identify issues, problems or potential improvements for further refinement of the specification and associated rules for the new market, and/or testing of market data distribution systems prior to deployment in a live market.

For example, different types of simulated market participants can also be specified for simulated testing of the new market. In one embodiment, a platform for a user defined market for electronic trading implements different types of simulated market participants as trader simulators, as discussed above. As shown in FIG. 25, at stage 2502, the market creator specifies trading personas that will be simulated, such as the following basic types of persona: market maker only, market taker only, and market maker and taker. Different trading strategies are automatically and/or can be specifically assigned to each basic persona type, can depend upon the order types defined for the new market. A market maker can, for example, submit limit orders at prices based upon an outside market, submit limit orders at market prices, submit limit orders at market prices a configurable number of 'pips' away from the market, and submit limit orders at market prices at multiple pip levels away from the market. For example, a market taker can submit an IOC order at the market, submit limit orders that match prices on the opposite side of the market, arbitrage between three currency pairs using either of the two preceding order strategies, and use a trend following strategy. Each persona can be assigned a set of sub-markets to trade. Each sub-market can also be assigned a level of activity or focus. Each persona can additionally be assigned an activity profile that spans the 24 hours of the day. For example, a Tokyo-based market maker may submit more liquidity during the Tokyo trading day, while a New York market taker may only operate during the New York trading day. In one embodiment, personas are stored as templates for simulation of future (new) markets. At stage 2504, the market creator specifies how many of each persona he/she wants to simulate trading in the test market. At stage 2506, the market creator (optionally) overrides the trading personas' activity levels with master liquidity and volatility controls that affect all simulated market participants in the simulation. At stage 2508, the market creator (optionally) specifies special events that affect the behavior of the participants (e.g., release of government statistics at an expected time, breaking news that occurs at an unexpected time, etc.). In one embodiment of a platform for a user defined market for electronic trading, different personas will behave differently in response to these special events depending on their trading strategy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for a user defined market for electronic trading, comprising:
    receiving a request at a new market creation platform of a new market service provider server to create a new market for electronic trading that includes a new class of trading instruments for the new market, wherein a market creator defines the new class of trading instruments for the new market using a trading technology platform, and wherein the new market is a user defined market that is defined by the market creator and is stored in a platform storage that is in communication with the new market service provider server;
    receiving a request at the new market creation platform to define a plurality of trading rules associated with the new class of trading instruments, wherein the market creator defines the plurality of trading rules that are stored in the platform storage;
    executing automated testing of the new market using a processor to simulate live trading of the new class of trading instruments in the new market, wherein the automated testing of the new market is performed using a trader simulator, and the trader simulator comprises a plurality of automated trading bots that dynamically trade the new class of trading instruments based on the plurality of trading rules in an electronic trading simulation of the new market, wherein the trader simulator simulates model traders using the plurality of automated trading bots to perform the automated testing of the new market, wherein the trader simulator executes the plurality of automated trading bots to dynamically trade the new class of trading instruments based on the plurality of trading rules during the electronic trading simulation of the new market, wherein each of the plurality of automated trading bots implements random number techniques with controllable probability distributions to generate trading actions matching configurable activity profiles, and wherein the trader simulator establishes a plurality of communications to one or more order switches for the generated trading actions;
    automatically generating the new market for live electronic trading using the processor based on results of the automated testing of the new market; and
    executing live electronic trading through the new market, wherein the new market for live electronic trading of the new class of trading instruments is implemented using the trading technology platform.

2. The method of claim 1, further comprising:
    specifying a plurality of types of simulated market participants based on user input from the market creator, wherein the market creator specified simulated market participants are implemented by the trader simulator, and the trader simulator simulates the new market in simulated testing of the new market; and
    selecting an activity level with master liquidity and volatility controls for the simulated market participants based on user input from the market creator, wherein the master liquidity and the volatility controls affect the simulated market participants.

3. The method of claim 1, further comprising:
    receiving a request at the new market creation platform to modify the new class of trading instruments, wherein the market creator modifies the new class of trading instruments based on results of the automated testing of the new market.

4. The method of claim 1, further comprising:
    receiving a request at the new market creation platform to modify one or more of the trading rules associated with the new class of trading instruments, wherein the market creator modifies one or more of the trading rules based on results the automated testing of the new market.

5. The method of claim 1, further comprising:
    receiving a request at the new market creation platform to select a special event based on user input from the market creator, wherein the trading performed by the trader simulators is affected by the special event.

6. The method of claim 1, further comprising:
    executing electronic trades of the new class of instruments requested by a plurality of authorized traders in the new market based on one or more of the plurality of trading rules.

7. The method of claim 1, wherein the new class of trading instruments comprises a new structure of a financial instrument, including a basic structure of the instrument, trading units, price granularity, and matching rules.

8. The method of claim 1, further comprising:
    receiving a request at the new market creation platform to define a plurality of access rules based on authorized user input for the new market, wherein the access rules restrict user access including access to data for the new market subject to regulatory market restrictions and access to modify the trading rules for the new market.

9. The method of claim 1, wherein the defining of the trading rules associated with the new class of trading instruments includes defining associated matching rules and settlement rules subject to regulatory market restrictions.

10. The method of claim 1, wherein the defining of the new class of trading instruments and the plurality of trading rules associated with the new class of trading instruments is performed by the market creator using a web-based graphical interface.

11. The method of claim 1, wherein the new class of instruments are selected from the group of new classes of real estate derivatives, insurance derivatives, credit derivatives, government securities, private securities, futures and options on futures.

12. The method of claim 1, further comprising:
automatically billing traders in the new market; and
automatically collecting payments on behalf of the market creator.

13. The method of claim 1, further comprising:
automatically billing traders in the new market, wherein the billing includes an access fee and a transaction based fee; and
automatically collecting payments on behalf of the market creator.

14. The method of claim 1, wherein each of the plurality of automated trading bots is assigned one of a plurality of configurable persona types selected from one or more of the following: a market maker only, a market taker only, and a market maker and a market taker, wherein different trading strategies are automatically and/or specifically assigned to each of the configurable persona types, and wherein each of the configurable persona types is assigned one of the configurable activity profiles.

15. A system for a user defined market for electronic trading, comprising:
a new market service provider server that comprises a new market creation platform executed on a processor of the new market service provider server; and
a platform storage that is in communication with the new market service provider server;
wherein the processor of the new market service provider server is configured to implement a trading technology platform, wherein the processor of the new market service provider server is further configured to:
receive a request at the new market creation platform to create a new market for electronic trading that includes a new class of trading instruments for the new market, wherein a market creator defines the new class of trading instruments for the new market using the trading technology platform, and wherein the new market is a user defined market that is defined by the market creator and is stored in the platform storage of the trading technology platform;
receive a request at the new market creation platform to define a plurality of trading rules associated with the new class of trading instruments, wherein the market creator defines the plurality of trading rules that are stored in the platform storage;
execute automated testing of the new market to simulate live trading of the new class of trading instruments in the new market, wherein the automated testing of the new market is performed using a trader simulator, and the trader simulator comprises a plurality of automated trading bots that dynamically trade the new class of trading instruments based on the plurality of trading rules in an electronic trading simulation of the new market, wherein the trader simulator simulates model traders using the plurality of automated trading bots to perform the automated testing of the new market, wherein the trader simulator executes the plurality of automated trading bots to dynamically trade the new class of trading instruments based on the plurality of trading rules during the electronic trading simulation of the new market, wherein each of the plurality of automated trading bots implements random number techniques with controllable probability distributions to generate trading actions matching configurable activity profiles, and wherein the trader simulator establishes a plurality of communications to one or more order switches for the generated trading actions;
automatically generate the new market for live electronic trading based on results of the automated testing of the new market; and
execute live electronic trading through the new market, wherein the new market for live electronic trading of the new class of trading instruments is implemented using the trading technology platform.

16. The system of claim 15, wherein the processor of the new market service provider server is further configured to:
specify a plurality of types of simulated market participants based on user input from the market creator, wherein the market creator specified simulated market participants are implemented by the trader simulator, and the trader simulator simulates the new market in simulated testing of the new market; and
select an activity level with master liquidity and volatility controls for the simulated market participants based on user input from the market creator, wherein the master liquidity and the volatility controls affect the simulated market participants.

17. The system of claim 15, wherein the processor of the new market service provider server is further configured to:
receive a request at the new market creation platform to modify the new class of trading instruments, wherein the market creator modifies the new class of trading instruments based on results of the automated testing of the new market.

18. The system of claim 15, wherein the processor of the new market service provider server is further configured to:
receive a request at the new market creation platform to modify one or more of the trading rules associated with the new class of trading instruments, wherein the market creator modifies one or more of the trading rules based on results the automated testing of the new market.

19. The system of claim 15, wherein the processor of the new market service provider server is further configured to:
execute electronic trades of the new class of instruments requested by a plurality of authorized traders in the new market based on one or more of the plurality of trading rules.

20. A computer program product for a user defined market for electronic trading, the computer program product being embodied in a non-transitory computer readable storage medium and comprising computer instructions for:
receiving a request at a new market creation platform to create a new market for electronic trading that includes a new class of trading instruments for the new market, wherein a market creator defines the new class of trading instruments for the new market using a trading technology platform, and wherein the new market is a user defined market that is defined by the market creator and is stored in a platform storage;

receiving a request at the new market creation platform to define a plurality of trading rules associated with the new class of trading instruments, wherein the market creator defines the plurality of trading rules that are stored in the platform storage;

executing automated testing of the new market to simulate live trading of the new class of trading instruments in the new market, wherein the automated testing of the new market is performed using a trader simulator, and the trader simulator comprises a plurality of automated trading bots that dynamically trade the new class of trading instruments based on the plurality of trading rules in an electronic trading simulation of the new market, wherein the trader simulator simulates model traders using the plurality of automated trading bots to perform the automated testing of the new market, wherein the trader simulator executes the plurality of automated trading bots to dynamically trade the new class of trading instruments based on the plurality of trading rules during the electronic trading simulation of the new market, wherein each of the plurality of automated trading bots implements random number techniques with controllable probability distributions to generate trading actions matching configurable activity profiles, and wherein the trader simulator establishes a plurality of communications to one or more order switches for the generated trading actions;

automatically generating the new market for live electronic trading based on results of the automated testing of the new market; and executing live electronic trading through the new market, wherein the new market for live electronic trading of the new class of trading instruments is implemented using the trading technology platform.

21. The computer program product of claim 20, further comprising instructions for:

specifying a plurality of types of simulated market participants based on user input from the market creator, wherein the market creator specified simulated market participants are implemented by the trader simulator, and the trader simulator simulates the new market in simulated testing of the new market; and selecting an activity level with master liquidity and volatility controls for the simulated market participants based on user input from the market creator, wherein the master liquidity and the volatility controls affect the simulated market participants.

22. The computer program product of claim 20, further comprising instructions for:

receiving a request at the new market creation platform to modify the new class of trading instruments, wherein the market creator modifies the new class of trading instruments based on results of the automated testing of the new market.

23. The computer program product of claim 20, further comprising instructions for:

receiving a request at the new market creation platform to modify one or more of the trading rules associated with the new class of trading instruments, wherein the market creator modifies one or more of the trading rules based on results the automated testing of the new market.

24. The computer program product of claim 20, further comprising instructions for:

executing electronic trades of the new class of instruments requested by a plurality of authorized traders in the new market based on one or more of the plurality of trading rules.

* * * * *